United States Patent
Wendel

[15] 3,691,222
[45] Sept. 12, 1972

[54] METHOD OF PREPARING SILYL ALCOHOLS
[72] Inventor: Samuel R. Wendel, Missoula, Mont.
[73] Assignee: Dow Corning Corporation, Midland, Mich.
[22] Filed: Feb. 26, 1971
[21] Appl. No.: 119,374

Related U.S. Application Data

[63] Continuation-in-part of Ser. No. 837,296, June 27, 1969, abandoned.

[52] U.S. Cl...260/448 ZE, 260/448 ZB, 260/448 ZN
[51] Int. Cl..................................................C07f 7/08
[58] Field of Search................................260/448 ZE

[56] References Cited

OTHER PUBLICATIONS

Noller, " Chemistry of Organic Compounds" , 3rd Ed., W. B. Saunders Co., Phil. (10/66), p. 813.

Primary Examiner—Delbert E. Gantz
Assistant Examiner—P. F. Shaver
Attorney—Robert F. Fleming, Jr., Harry D. Dingman and Laurence R. Hobey

[57] ABSTRACT

Silyl alcohols are prepared by reacting alkylene oxides (such as ethylene oxide) with alkoxysilanes or siloxanes containing the group SiRSH in an alcohol promoter and optionally in the presence of acid or base catalysts such as toluene sulfonic acid, zinc chloride or triethylamine. The product has the group SiRSCH(R')CH(R)OH.

4 Claims, No Drawings

3,691,222

METHOD OF PREPARING SILYL ALCOHOLS

This application is a continuation-in-part of application, Ser. No. 837,296, filed June 27, 1969 now abandoned.

Prior to this invention silyl alcohols, that is those materials having a hydroxyl connected to the silicon through a silicon-carbon bond, have been prepared by the addition of SiH compounds to unsaturated alcohols, for example, allyl alcohol. This method suffers from two disadvantages. One is that the best catalyst for such reaction is platinum which also catalyzes the reaction of SiH with hydroxyl groups to eliminate hydrogen and to substitute an alkoxy group on the silicon. Also platinum catalyzes the isomerism of double bonds so that the double bond shifts from the terminal position to an internal position and double bonds in the internal position do not add to SiH compounds under normal conditions. Thus, often yields of silyl alcohols by the heretofore known methods have been poor. The present method avoids the above difficulty since platinum is not required as a catalyst and SiH compounds are not employed as starting materials.

The silyl alcohols prepared by the method of this invention are useful as priming agents for urethane plastics on various substrates such as wood or concrete, and also are useful as intermediates in the preparation of silicone-alkyd resins.

This invention relates to the method comprising reacting a compound (1) having the group ≡SiRSH with an alkylene oxide of the formula

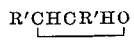

by mixing the two in the presence of an alcohol in liquid form* (*The term "in liquid form" means that either the alcohol is liquid under reaction conditions or that it is soluble in a liquid reactant or in a mutual solvent for the alcohol and the reactants.) in amount of at least 1 percent by weight based on the weight of reactants (1), at a temperature sufficient to form, (2) ≡SiRSCH(R')CH(R')OH in which R is a divalent hydrocarbon radical free of aliphatic unsaturation, R' is hydrogen, a lower alkyl or a lower haloalkyl radical and the remaining valences of the silicon in (1), and (2) being satisfied by alkoxy radicals, oxygen atoms of SiOSi— linkages, monovalent hydrocarbon radicals or monovalent halohydrocarbon radicals.

This invention also relates to the method comprising carrying out the above reaction in the presence of an acid or basic catalyst in catalytic amount.

Thus it can be seen that alcohols promote the reaction of the silyl mercaptans with the alkylene oxide, both in the presence or absence of a catalyst. The temperature at which the reaction takes place is not critical. The rate depends upon the silane reactant, the particular alcohol and the alcohol catalyst combination. In general, the reaction will proceed faster with a catalyst present, but with alcohol alone the reaction may be complete, for example, in 30 minutes at room temperature. Many reactions can be carried out at room temperature or below, or by heating at temperature of say 50° to 100° C. or above.

The silicon-containing reactant employed herein is a mercaptan in which the SH group is attached to the silicon through a divalent hydrocarbon radical which is free of aliphatic unsaturation. Such radicals include the methylene radical, the dimethylene radical, the trimethylene radical, the hexamethylene radical or the octadecamethylene radical. These divalent radicals can be branched such as —CH$_2$CH(CH$_3$)CH$_2$— or —CH$_2$CH$_2$CH(C$_2$H$_5$)CH$_2$—. The divalent hydrocarbon radicals can also contain aryl groups and can be those such as the phenylene radical or radicals of the formula —CH$_2$CH$_2$C$_6$H$_4$, C$_6$H$_4$CH$_2$—, or cycloalkylene radicals such as the cyclohexylene radical or the cyclopentylene radical.

The remaining valences of the silicon atom in the starting silanes can be any alkoxy group such as methoxy, ethoxy, isopropoxy, decyloxy, octadecyloxy, benzyloxy; alkoxyalkoxy groups such as beta-methoxyethoxy, beta-ethoxyethoxy, —O(CH$_2$CH$_2$O)$_2$CH$_3$ or —OCH(CH$_3$)CH$_2$OCH$_3$.

The substituents on the silicon can also be any monovalent hydrocarbon radical such as alkyl radicals such as methyl, ethyl, butyl, octadecyl or myricyl; alkenyl radicals such as vinyl, allyl, or hexenyl; cycloaliphatic radicals such as cyclopentyl, cyclohexyl or cyclohexenyl; aryl radicals such as phenyl, tolyl, xylyl, naphthyl or xenyl; and aralkyl radicals such as benzyl, beta-phenylethyl or beta-phenylpropyl. The silicon can also be substituted with any halohydrocarbon radical such as chloromethyl, gamma-chloropropyl, 3,3,3-trifluoropropyl, bromophenyl, chlorophenyl, bromoxenyl, alpha,alpha,alpha-trifluorotolyl, chlorocyclohexyl or perchlorovinyl.

The alkylene oxide employed in this invention can be those of the formula

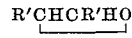

in which each R' can individually be hydrogen, i.e. ethylene oxide, or a lower alkyl or a lower haloalkyl radical; i.e. substituted ethylene oxides such as propylene oxide, butylene oxide, epibromohydrin or

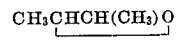

The catalyst employed in this invention can be any acid or basic material. The amount of catalyst is not critical so long as there is enough to promote the reaction. Thus, the catalyst can range from trace to stoichiometric amounts.

The acid materials include inorganic acids such as hydrochloric acid, sulfuric acid, nitric acid; or organic acids such as carboxylic acids such as acetic acid, benzoic acid, acrylic acid; sulfonic acids such as toluene sulfonic acid, benzene sulfonic acid or ethylsulfonic acid; or acid salts such as zinc chloride, aluminum chloride, ferric chloride (that is the so-called Lewis acids). The catalyst can also be any basic compounds such as amines, such as triethylamine, tributylamine, methylamine, dimethylamine, cyclohexylamine, allylamine; or alkali metal or alkaline earth metal hydroxides such as sodium hydroxide, calcium hydroxide or potassium hydroxide; or ammonia or quaternary ammonium compounds such as tetramethyl ammonium hydroxide, benzyldimethyl ammonium hydroxide, beta-hydroxyethyl(trimethyl) ammonium hydroxide;

or phosphonium compounds such as tetramethyl phosphonium hydroxide; alkali metal alkoxides such as sodium methoxide, potassium butoxide or lithium ethoxide or alkali metal phenoxides such as sodium phenoxide or lithium phenoxide.

It should be understood that the acid or basic catalyst can be in any form, that is, in the form of monomeric material or the polymeric material. For example, the acid or basic catalyst can be in the form of an acid or basic ion exchange resin. The catalyst, if desired, can be supported on an inert material although preferably the catalyst is in the form of a monomeric material free of support.

The alcohol promoters employed in this invention can be any liquid alcohol, or one that is soluble in the reactants which includes aliphatic alcohols such as methanol, ethanol, butanol, isopropanol, hexanol; aromatic alcohols such as benzyl alcohol, beta-phenylethanol; and alcohol ethers such as beta-methoxyethanol, beta-ethoxyethanol, beta-methoxyisopropanol, the monomethyl ether of diethylene glycol; or dihydric and polyhydric alcohols such as ethylene glycol, glycerine, or diethylene glycol. In those cases in which an alkoxy silane is a reactant it is desirable, but not essential that the alcohol correspond to the alkoxy groups on the silicon.

If desired, solvents such as hydrocarbons such as hexane, benzene, toluene or xylene or polar compounds such as dimethylsulfoxide can be used.

The following examples are illustrative only and should not be construed as limiting the invention which is properly delineated in the appended claims.

In the following examples the following abbreviations are employed: Me for the methyl radical, Et for the ethyl radical, Ph for the phenyl radical and Vi for the vinyl radical.

EXAMPLE 1

A mixture of 74 g. of $(Me_3SiO)_2MeSi(CH_2)_3SH$, 15.3 g. of ethylene oxide, 0.5 g. of toluene sulfonic acid, 50 ml of dimethylsulfoxide, 50 ml of methanol and 50 ml of isopropanol was allowed to react at room-temperature for 7 days. The product obtained was $(Me_3SiO)_2MeSi(CH_2)_3SCH_2CH_2OH$.

EXAMPLE 2

A stirred solution of 74 g. of $(Me_3SiO)_2MeSi(CH_2)_3SH$, 100 ml of isopropanol and a few drops of triethylamine was heated to 80° C. and 11 g. of ethylene oxide was bubbled into the mixture. The mixture was stripped of isopropanol and was distilled under reduced pressure to give 74.8 g. of $(Me_3SiO)_2MeSi(CH_2)_3SCH_2CH_2OH$, which had the following properties: b.p. at 0.05 mm. 89 to 91° C., $n_D^{25}$ 1.4431, $d_4^{25}$ 0.9331, $R_D$ observed 0.2842, calculated 0.2849. Infrared spectrograph showed peaks for OH (3,400), $SCH_2$ (1,420), SiMe (1,260) and SiOSi (1,050 to 1,100 cm$^{-1}$).

EXAMPLE 3

When the following siloxanes and alkylene oxides are substituted in the procedure of Example 1, the following products are obtained:

| | Siloxane | Alkylene Oxide | Product |
|---|---|---|---|
| 1. | PhMeViSiOSiMe$_2$CH$_2$SH | MeCHCH$_2$O | PhMeViSiOSiMe$_2$CH$_2$SCH$_2$CH(Me)OH |
| 2. | Copolymer of 10 mol % C$_{18}$H$_{37}$SiO$_{1.5}$ 20 mol % Et$_2$SiO 25 mol % Me(Ph)CHCH$_2$Si(Me)O 10 mol % ClC$_6$H$_4$SiO$_{1.5}$ 35 mol % HS(CH$_2$)$_3$Si(Me)) | MeCHCHMeO | Copolymer of 10 mol % C$_{18}$H$_{37}$SiO$_{1.5}$ 20 mol % Et$_2$SiO 25 mol % Me(Ph)CHCH$_2$Si(MeO) 10 mol % ClC$_6$H$_4$SiO$_{1.5}$ 35 mol % HO(Me)CHCH(Me)S(CH$_2$)$_3$(Me)SiO |
| 3. | CF$_3$CH$_2$CH$_2$(Me)$_2$SiOSiMe$_2$(CH$_2$)$_3$SH | FCH$_2$CHCH$_2$O | CF$_3$CH$_2$CH$_2$(Me)$_2$SiOSiMe$_2$(CH$_2$)$_3$SCH$_2$CH(CH$_2$F)OH |
| 4. | HS(CH$_2$)$_3$(C$_6$H$_{11}$)MeSiO$_{.5}$Si | EtCHCH$_2$O | HO(Et)CHCH$_2$S(CH$_2$)$_3$(C$_6$H$_{11}$)MeSiO$_{.5}$Si |

EXAMPLE 4

When the following alkoxysilanes are reacted with ethylene oxide in the presence of the following alcohols in amount of 20 percent by weight based on the reactants and in the presence of zinc chloride as a catalyst the following products are obtained:

| Alkoxysilane | Alcohol | Product |
|---|---|---|
| omega-mercapto octadecyltrimethoxysilane | ethanol | HO(CH$_2$)$_2$SC$_{18}$H$_{36}$Si(OMe)$_3$ |
| para-mercapto phenyltriethoxysilane | ethanol | HO(CH$_2$)$_2$SC$_6$H$_4$Si(OEt)$_3$ |
| HSCH$_2$CH(Me)CH$_2$Si(Me$_2$)OCHMe$_2$ | hexyl alcohol | HO(CH$_2$)$_2$SCH$_2$CH(Me)CH$_2$Si(Me$_2$)OCH(Me)$_2$ |
| HSC$_6$H$_{10}$Si(OCH$_2$CH$_2$OMe)$_3$ | MeOCH$_2$CH$_2$OH | HO(CH$_2$)$_2$SC$_6$H$_{10}$Si(OCH$_2$CH$_2$OMe)$_3$ |
| HSC$_6$H$_4$CH$_2$CH$_2$Si(OCH$_2$CH$_2$Cl)$_3$* | ClCH$_2$CH$_2$OH | HO(CH$_2$)$_2$SC$_6$H$_4$(CH$_2$)$_2$Si(OCH$_2$CH$_2$Cl)$_3$ |
| HS(CH$_2$)$_2$C$_6$H$_4$(CH$_2$)$_2$Si(OMe)$_3$ | ethylene glycol | HO(CH$_2$)$_2$S(CH$_2$)$_2$C$_6$H$_4$(CH$_2$)$_2$Si(OMe)$_3$ |

*Catalyst is HCl

EXAMPLE 5

Equivalent results are obtained when the following catalysts are substituted in the process of Example 1:

Ferric chloride, HCl, sulfuric acid, benzyltrimethyl ammonium chloride, sodium ethoxides, lithium phenoxide, a quaternary ammonium ion exchange resin made from a copolymer of styrene and divinyl benzene sold under the name Amberlyst 26, hexylamine, tetramethyl phosphonium hydroxide and phosphoric acid.

EXAMPLE 6

To a solution of 74 g. of $(MeSiO)_2MeSi(CH_2)_3SH$ in 100 ml of methanol was bubbled with stirring 11 g. of ethylene oxide. The mixture stood at room temperature for 64 hours. A vapor phase chromatograph showed no starting material and an excellent yield of $(Me_3SiO)_2MeSi(CH_2)_3SCH_2CH_2OH$.

EXAMPLE 7

98 g. of $(MeO)_3Si(CH_2)_3SH$ (1) was mixed with 98 ml of methanol and 22.5 g. of ethylene oxide was added with stirring over a 30 minute period. The temperature rose from 18° to 39° C. After 30 minutes the product was examined by GLC and no starting mercaptan was found indicating a quantitative yield of the product $(MeO)_3Si(CH_2)_3SCH_2CH_2OH$.

The experiment was repeated by passing 22.5 g. of ethylene oxide into 98 g. of (1) in the absence of the alcohol. No reaction took place as shown by no rise in temperature and GLC showed essentially no reduction in the amount of (1).

That which is claimed is:

1. A method comprising reacting a compound
1. having the group ≡ SiRSH with an alkylene oxide of the formula

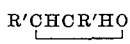

by mixing the two in the presence of an alcohol in liquid form, the hydroxyl groups of said alcohol being attached to aliphatic carbon atoms, in amount of at least 1 percent by weight based on the weight of reactants (1) at a temperature sufficient to form 2. ≡ SiRSCH(R')CH(R')OH in which R is a divalent hydrocarbon radical free of aliphatic unsaturation, R' is hydrogen, a lower alkyl or a lower haloalkyl radical, the remaining valences of the silicon in (1) and (2) being satisfied by alkoxy radicals, oxygen atoms of SiOSi—, linkages, monovalent hydrocarbon radicals or monovalent halohydrocarbon radicals.

2. The process of claim 1 in which the reaction is carried out in the presence of an acid or basic catalyst in catalytic amount.

3. The process in accordance with claim 1 in which (1) is a methylsiloxane.

4. The process in accordance with claim 2 in which (1) is a methylsiloxane.

* * * * *